United States Patent
Waldrop

(10) Patent No.: US 6,325,127 B1
(45) Date of Patent: Dec. 4, 2001

(54) ULTRASONIC SEWING MACHINE AND BONDING WHEEL ASSEMBLY

(75) Inventor: Randy Mac Waldrop, Albertville, AL (US)

(73) Assignee: Kappler Protective Apparel & Fabrics, Gunterville, AL (US)

( * ) Notice: Subject to any disclaimer, the term of this patent is extended or adjusted under 35 U.S.C. 154(b) by 0 days.

(21) Appl. No.: 09/229,847

(22) Filed: Jan. 12, 1999

(51) Int. Cl.[7] .................................................. B29C 65/08
(52) U.S. Cl. .......................... 156/510; 156/553; 156/582; 156/73.1; 156/73.3; 156/290; 156/580.1; 156/515; 156/251; 83/481; 83/954; 83/956
(58) Field of Search .............................. 156/73.3, 73.4, 156/251, 308.4, 510, 515, 580.1, 580.2, 582, 290, 553; 83/954, 956, 481

(56) References Cited

U.S. PATENT DOCUMENTS

| | | | |
|---|---|---|---|
| 173,126 | * 8/1876 | Little | 83/481 |
| 3,785,910 | * 1/1974 | Parry | 156/580.1 |
| 4,534,819 | * 8/1985 | Payet et al. | 156/580.2 |
| 5,099,733 | * 3/1992 | Kobayashi et al. | 83/481 |
| 6,098,514 | * 8/2000 | Sato et al. | 83/956 |

* cited by examiner

*Primary Examiner*—Michael A. Tolin
(74) *Attorney, Agent, or Firm*—Waddey & Patterson; Richard S. Myers, Jr.

(57) ABSTRACT

An ultrasonic seam welding apparatus for seam welding at least two sheetlike work pieces piled one above the other by imparting ultrasonic osculation is expressed through the ultrasonic binding and cutting quill assembly. The ultrasound seaming and cutting apparatus comprises a receptive resonant horn or wheel for receiving a rotating anvil wheel and a cutting surface thereon. An apparatus and receiving component having overlapping surfaces and welding the components together with the use of ultrasound. An ultrasound emitter and wheel receives the high frequency current and converts it into mechanical ultrasonic vibrations having the same frequency.

13 Claims, 2 Drawing Sheets

ULTRASONIC SEWING MACHINE AND BONDING WHEEL ASSEMBLY

BACKGROUND OF THE INVENTION

FIELD OF THE INVENTION

The present invention relates to an ultrasonic bonding wheel assembly for cutting and sealing both sealable fabrics and tape material. In yet another aspect of the invention is the method for sealing sheetlike materials without bonding holes through the seam.

The present invention concerns an ultrasonic seaming apparatus in which vibratory energy in the sonic or ultrasonic frequency range is used for welding or fusing together two superposed flexible sheet materials by passing such materials between a anvil and the output surface of a resonating horn. An apparatus of this type is particularly suited for seaming thermoplastic sheets or textile materials made entirely of thermoplastic fibers and is known also as an "ultrasonic sewing machine", although no needle and thread are used for providing a seam.

Unique problems present themselves when a seaming apparatus of this type is used for seaming sheer material, for instance curtain material. Upon feeding such material through the seaming station between the resonating horn and the anvil, puckering occurs which adversely affects the appearance, quality, and sales appeal of the seamed article. It has been found that such puckering can be minimized, if not totally eliminated, if a special feed wheel is provided which is disposed for engaging the workpiece immediately after its emergence from the seaming station, pulling the workpiece away from such station. Therefore, the present invention concerns the provision of a workpiece feeding wheel designed and mounted in such a way that it is urged toward contact with the periphery of the rotating anvil wheel and engages the respective workpieice portion immediately after the passage thereof between the anvil wheel and the frontal surface of the resonating horn. Means are present for diving the anvil wheel and the workpiece feed wheel at coordinated peripheral speeds.

A still other object of the present invention concerns the construction of an ultrasonic seaming apparatus which is provided with a workpiece immediately after its passage through the seaming station.

A further object of this invention is the provision of an ultrasonic seaming apparatus which includes a seaming station comprising a rotatable anvil wheel and a resonating horn mounted for providing ultrasonic energy to a workpiece which is fed between the frontal surface of the horn and the anvil, a workpiece feed wheel disposed for engaging the workpiece, means for urging the workpiece feed wheel toward contact with the anvil wheel, and drive means coupled for driving the anvil wheel and the workpiece feed wheel at correlated peripheral speeds.

The present apparatus discloses a seaming and cutting apparatus of this type in which ultrasonic means are provided to effect a longitudinal seam and additional means are provided to simultaneously cut and fuse the material adjacent the seamed are without that excessive wear is manifest at the instrumentality providing such cutting action. In this manner it is possible to fabricate completely finished articles, such as curtains or spreads, wherein the folded seam or hem usually deemed necessary to provide an acceptable finished appearance can be omitted. Moreover, the cutting instrumentality operable in conjunction with the seaming apparatus is constructed so as to eliminate excessive wear by being resiliently mounted relative to the frontal surface of the horn which provides the mechanical energy for cutting. A further salient feature of the invention concerns an arrangement for adjusting the cutting action with regard to pressure and bringing unused cutting edge portions into operative position.

More recently the need has arisen for a seaming machine which ultrasonically fuses or bonds two or more layers of thermoplastic material together in a manner similar to a sewing machine and includes means for cutting and fusing the material in a marginal portion adjacent the seam.

In various industries, it is necessary for certain employees and others to be in close proximity to hazardous chemicals and others hazardous matter. Local, state, and federal laws and/or regulations often require the use of protective garments under such circumstances. It is frequently not feasible to utilize "permanent" protective garments because of the necessity to decontaminate the garments regularly, which may be impossible or prohibitively expensive. A widely used alternative to such permanent protective garments is the disposable garment, made of man-made materials which are lightweight, resistant to tearing and abrasion, and relatively impermeable to hazardous substances. Such synthetic fabrics are available, such as spunbounded olefin, which are very satisfactory. They are good barriers to particulates and a broad range of chemicals, have high tensile strength and tear resistance, and are reasonably economical. An example of this synthetic fabric is sold by E.I. du Pont de Nemours & Co. under its trademark Tyvek, to which may be added a polyethylene or polyvinylidine chloride film coat or lamination on one of its two sides to make it even more impervious to hazardous substances.

A technical problem in using such synthetic fabrics is how to form garments therefrom without significant loss of the favorable properties of the fabrics. In virtually all instances, a stitching process issued in whole or in substantial, a stitching process is used in whole or in substantial part to form garments from such synthetic materials so that they will conform generally to the shape of the human body. However, the stitching process obviously results in the creation of many holes in the fabric which are points of vulnerability through which hazardous gases, liquids and some small solid particulates can penetrate, with possible damage to the body or inner clothing, or both, of the person wearing the protective garment. It is thus desirable to minimize to the extent possible the use of traditional stitching methods which create such vulnerable holes.

One patent, Goldstein U.S. Pat. No. 4,272,851, attempts to solve this problem by ultrasonically bonding together edges of synthetic fabric, preferably polyethylene coated (laminated) Tyvek. However, Goldstein suggests the ultrasonic bonding of congruent edges of the Tyvek, presumably laminated side to laminated side. This procedure results in a seam which has inadequate resistance to rupture from shearing. In order to give greater strength against shear stresses, Goldstein adds a binding along the folded back seam, which binding is sewed on by traditional stitching means. While the multiple layers so stitched may be somewhat more protective than earlier stitching methods, it is still possible for hazardous chemicals and substances to get inside the garment through the holes created by sewing.

SUMMARY OF THE INVENTION

It is an object of the invention to provide a method for bonding any seams of synthetic fabric in a manner that does not result in holes, which holes impair the protective qualities of protective garments made from such synthetic fabric.

It is further object of this invention to provide an efficient method of binding together the closing seam of a part of such protective garment, such closing seams (for example, closing the sleeves or legs of a garment) presenting special problems which are solved by the present invention.

Briefly, but not by way of limitation, the present invention provides a method for bonding overlapping edges of parts of garments, as opposed to congruent edges, using ultrasonically bondable fabric. The bond thus obtained is very strong and is adequately resistant to shearing stresses, thus eliminating the need for stitching to strengthen the seam against possible shearing. While a single seam is ordinarily edges along their respective extremities.

It is found that ultrasonic bonding will occur between the overlapping edges where laminated and unlaminated sides are in contact with each other, but that little or no ultrasonic bonding occurs between the folded-under fabric and either of the overlapping edges where unlaminated sides only are in contact with each other. To the extent any slight bonding takes places between the unlaminated surfaces, a slight shearing force can be applied which unfolds the folded-under portion, without in any way disturbing the secure bond achieved between the overlapping edges which it was the purpose of the invention to produce. This very satisfactorily closes the seam ultrasonically which otherwise would be difficult or impossible to do.

Other and still further important features of the present invention will be more clearly apparent by reference to the following description when taken in conjunction with the accompanying drawing.

DETAILED DESCRIPTION OF THE INVENTION

Figure 1:
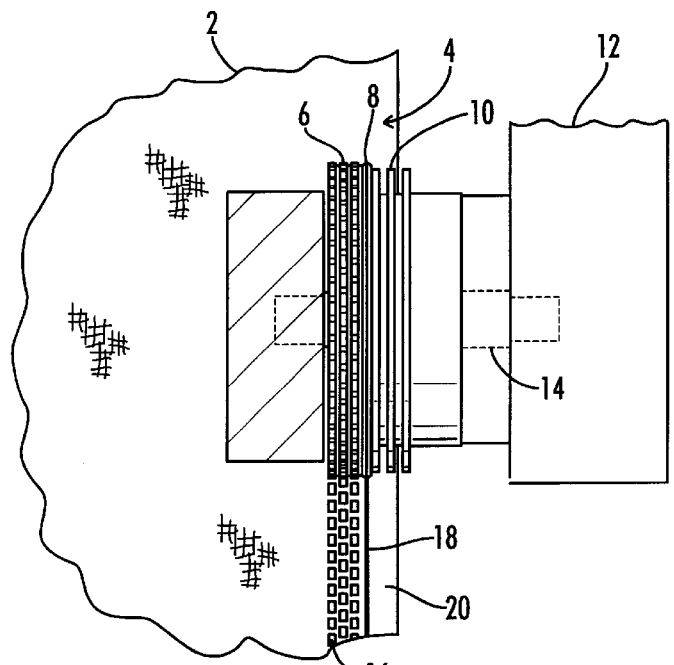
FIG. 1 is a top view partially sectioned of a ultrasonic wheel welding and cutting device according to the invention and a drive and ultrasonic means.

The ultrasonic bonded fabric 2 is shown with the ultrasonic wheel and cutting assembly 4 in a top view which is partially sectional. The ultrasonic bonding wheels assembly 6 is shown with the top wheel portions in place and assembled. The ultrasonic cutting wheel 8 is shown in connection with the bonding teeth wheels 6. A fabric positioning and cooling wheels 10 are also shown in assembled fashion with the teeth wheels 6 and cutting wheel 8. The ultrasonic cutaway drive means 12 is connected with the hidden drive shaft for use for wheel assembly drive 14. An ultrasonic bonding of the fabric 16 is shown for fabric cutline 18 and fabric trim 20.

Figure 2:
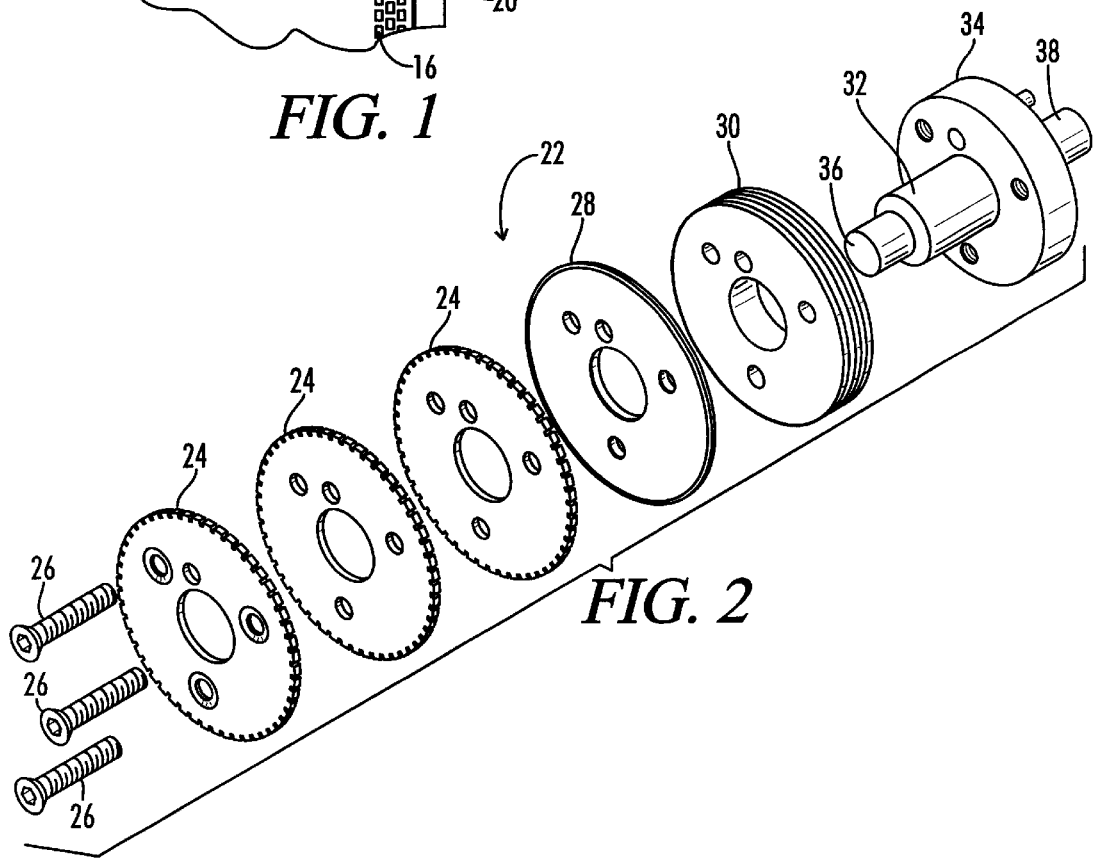
FIG. 2 is a exploded view of the wheel with various component parts including set screws and central shafting for fixing the component parts of the ultrasonic wheel and cutting device.

An exploded view of FIG. 2 of the ultrasonic bonding and cutting wheel assembly 2 is shown in an exploded view of the ultrasonic wheel assembly 22. A separate ultrasonic wheel teeth device is connected with three sets of screws 26 which block the assembled parts together. The knife wheel 28 are in the alternative a sealing wheel 28 is also in the assembly for obvious reasons. The fabric positioning and cooling wheel 30 are mounted along with the rest of the assembly on the mounting shaft 32. A wheel support 34 is also mounted with the same shaft and assemblage for mounting the ultrasonic bonding and cutting wheel assembly. The mounting shaft assembly 32 is also in addition to wheel support 34 produces a reduced shaft 36 which provides port and wheel drive shafting 38.

Figure 3:
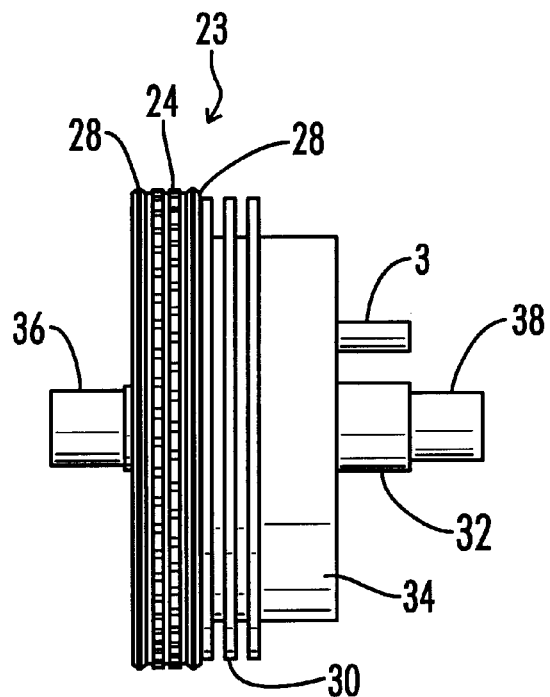
FIG. 3 is the ultrasonic bonding wheel and cutting device assembled and in side view.

FIG. 3 is a side view of the assembled wheel according to the invention. In FIG. 3 a ultrasonic bonding and cutting wheel assembly is shown 4 in assembled position from the side. Therein on each side of the ultrasonic wheel assembly 23 is the shaft 36 and 38 portion of which is reduced in diameter reading on 36 and a wheel support and wheel drive shaft 38. Included unseen and unshown with head marks are the screws that bond the wheel together along with an ultrasonic wheel assembly 3 which bonds the wheel as seen. The FIG. 3 is in position in assemblage for use with the drive means acting on the wheel support and wheel drive shaft 38.

Figure 4:
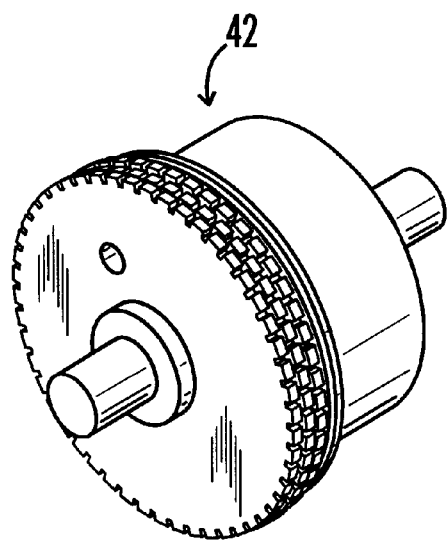
FIG. 4 shows a machine solid piece undetectable solid wheel for ultrasonic bonding and cutting which represents the prior art.

FIG. 4 is a pictorial view of the prior art mechanism which is machined from one solid block of material. The wheel as shown in representing prior art is incapable of being assembly as strictly a machine object. The wheel 42 as shown by prior art is incapable of replacement or positioning in any other form of the cutting wheel in relationship to the teething wheels. If a worker drops such a wheel during use and damage same, the machine wheel is thrown away because of dulling of the knife or blunting of the knife or other reasons if dropped or premature wear.

Advantages of the present wheel assembly allows substitution of parts moreover allows replacement of parts through wear and use. The wheel assembly according to the invention allows the sealing to be inserted with the mechanisms including crank wheels which primarily represents a wheel assembly for ultrasonic bonding. The cutting wheel of the wheel assembly allows for trim of ultrasonic bonding seals which are used to seal fabric for human consumption. These suits made from fabric require these strong but yet safe seals which can even amount to airtight seals. Ultrasonic bonding does not burn through but yet has a melting and a tooth effect which leaves a pattern seal as shown in FIG. 1.

In use the prior art wheels would wear the cutting wheel first before any of the rest of the machine product was damaged and had to be destroyed but with the present wheel assembly of the present invention you can change out cutting wheels and any other damaged wheels which wear prematurely. Even when prior art machine wheels were sent out to be resharpened or other adjustments by milling, the returned adjusted wheels were of very poor quality. The old wheels consisting of solid wheels cost a great deal upward to 4 times a composite of assembly wheel adjustments. The refit of the present invention can act for several cycles and more or less perform as long as the original wheel assembly.

What is claimed is:

1. An ultrasonic sewing machine for fabrics, comprising:
   a resonating horn; and
   an anvil comprising a feed wheel assembly, said feed wheel assembly comprising a central shaft and at least three wheels including:
   a teething wheel;
   a cutting wheel or sealing wheel; and
   a cooling and gripping wheel;
   wherein said at least three wheels of the feed wheel assembly are removably mounted to the central shaft.

2. The ultrasonic sewing machine of claim 1, wherein said at least there wheels are removably mounted by at least two screws.

3. The ultrasonic sewing machine of claim 2, wherein the feed wheel assembly further comprises a wheel support rigidly positioned on the central shaft which receives the at least two screws.

4. The ultrasonic sewing machine of claim 3, wherein each of the at least three wheels of the feed wheel assembly has apertures to allow passage of the at least two screws to the wheel support.

5. The ultrasonic sewing machine of claim 1, said feed wheel assembly further comprising a pin.

6. The ultrasonic sewing machine of claim 1, the central shaft having portions with different diameters.

7. The ultrasonic sewing machine of claim 1, said ultrasonic sewing machine further comprising drive means for rotating the feed wheel assembly, wherein said central shaft is adapted to engage the drive means.

8. An ultrasonic bonding wheel assembly, comprising:

a central shaft;

at least three operation wheels including a cutting wheel or sealing wheel, a teething wheel, and a cooling and gripping wheel;

wherein each of said at least three operation wheels has an aperture adapted to receive the central shaft, and wherein the at least three operation wheels are removably mounted on the central shaft.

9. The ultrasonic bonding wheel assembly of claim 8, wherein said at least three operation wheels are removably mounted by at least two screws.

10. The ultrasonic bonding wheel assembly of claim 9, wherein each of the at least three operation wheels has apertures to allow passage of the at least two screws.

11. The ultrasonic bonding wheel assembly of claim 10, further comprising a wheel support rigidly positioned on the central shaft that receives the at least two screws.

12. The ultrasonic bonding wheel assembly of claim 8, wherein the ultrasonic bonding wheel assembly further comprises at least one pin.

13. The ultrasonic bonding wheel assembly of claim 8, wherein the central shaft has portions with different diameters.

\* \* \* \* \*